United States Patent
Sekime et al.

(10) Patent No.: US 6,407,787 B1
(45) Date of Patent: Jun. 18, 2002

(54) REFLECTIVE LIQUID CRYSTAL DISPLAY DEVICE

(75) Inventors: Tomoaki Sekime; Hisanori Yamaguchi; Yoshio Iwai, all of Ishikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 179 days.

(21) Appl. No.: 09/608,172

(22) Filed: Jun. 30, 2000

(30) Foreign Application Priority Data

Jun. 30, 1999 (JP) ............................. 11-185154

(51) Int. Cl.$^7$ ............................. G02F 1/1335
(52) U.S. Cl. ............ 349/119; 349/121; 349/113; 349/139
(58) Field of Search ............ 349/119–121, 117–118, 349/64, 113, 139, 122

(56) References Cited

FOREIGN PATENT DOCUMENTS

| JP | 6-175125 | 6/1994 |
|---|---|---|
| JP | 6-301006 | 10/1994 |
| JP | 7-84252 | 3/1995 |
| JP | 7-146469 | 6/1995 |
| JP | 10-31211 | 2/1998 |
| JP | 11-64818 | 3/1999 |

*Primary Examiner*—William L. Sikes
*Assistant Examiner*—Timothy Rude
(74) *Attorney, Agent, or Firm*—Ratner & Prestia

(57) ABSTRACT

The reflective liquid crystal display device uses only one polarizing film but achieves display of bright white and achromatic color with high contrast. The twisting angle of a nematic liquid crystal is set to 45° to 90°, and the retardation value of a liquid crystal layer is set to $\Delta nLC \cdot dLC = 0.20$ $\mu$m to 0.30 $\mu$m. Two retardation films are configured with a structural component having small chromatic dispersion in refractive index anisotropy and a z coefficient from 03 to 1.0. Retardation values of these two retardation films are set to RF1=0.23 $\mu$m to 0.28 $\mu$m, and RF2=0.13 $\mu$m to 0.18 $\mu$m. When the angle of an absorption axis direction of the polarizing film is denoted by $\phi P$, and the angles of retardation axes directions of the two retardation films are denoted by $\phi F1$ and $\phi F2$, a set of Formulae $\phi P=75°–195°$, $\phi P-\phi F1=95°–115°$, and $\phi P-\phi F2=155°–175°$ are satisfied.

40 Claims, 5 Drawing Sheets

Qz(1)/Qz(2)=0.5/0.5

Qz(1)/Qz(2)=0.5/1.0

REFLECTIVE LIQUID CRYSTAL DISPLAY DEVICE

FIELD OF THE INVENTION

The present invention relates to the field of reflective liquid crystal display devices.

BACKGROUND OF THE INVENTION

Liquid crystal display devices (LCDs) are used in a variety of appliances including display for mobile personal digital assistants, taking the advantage of the thin and light features. An LCD is a light receiving device which does not emit light itself but changes the light transmittance for displaying information. Since the LCD can be driven with a few volts, a reflective LCD, in which a reflector is provided underneath the LCD to display information using reflected external light, realizes an extremely low power consuming display device.

A conventional reflective color LCD includes a liquid crystal cell provided with a color filter and a pair of polarizing films interposing the liquid crystal cell. The color filter is disposed on one of substrates of the liquid crystal cell, and a transparent electrode is formed on the color filter. The voltage applied to this liquid crystal cell changes the ordering direction or orientation of the liquid crystal molecules, and thus changes the light transmittance of the liquid crystal for each color filter to display colored information.

The transmittance of the polarized light parallel to an absorption axis of the polarizing film is almost 0%, and that of the vertically polarized light is almost 90%. Light constituents vertical to the absorption axis in the non-polarized natural light is 50% of the total light. Accordingly, overall reflectance in the reflective LCD using two polarizing films in which the light passes through the polarizing films four times before exiting the reflective LCD is as follows when absorption of the light by the color filter and loss on the reflecting face are not considered:

$$(0.9)^4 \times 50\% = 32.8\%.$$

The reflectance is thus limited to around 33% even for a black and white panel.

In order to achieve brighter display, several prior arts disclose configuration to employ only one polarizing film on an upper side of the liquid crystal cell, and interpose the liquid crystal cell between one polarizing film and a reflector (e.g. Japanese Laid-open Patent Nos. H7-146469 and H7-84252). In this case, the light passes through the polarizing film only twice, and overall reflectance is as follows when absorption of the light by the color filter and loss on the reflecting face are not considered:

$$(0.9)^2 \times 50\% = 40.5\%.$$

The overall reflectance improves by about 23.5% at the maximum ($=(40.5/32.8) \times 100\% - 100\%$), compared to the configuration using two polarizing films.

Color LCDs which do not employ the color filter are disclosed in the Japanese Laid-open Patent Nos. H6-308481, H6-175125, and H6-301006. The Japanese Laid-open Patent No. H6-308481 discloses the reflective color LCD which uses birefringence of a twisted nematic liquid crystal layer and a polarizing film for color display. The Japanese Laid-open Patent Nos. H6-175125 and H6-301006 propose the color LCD which uses birefringence of the liquid crystal layer and a phase retardation film for color display.

However, the reflective LCD using two polarizing films may not be able to secure reflectance for achieving sufficient brightness.

The reflective LCD using one polarizing film displays color information by the use of the color filter, and secures sufficient brightness by increasing the reflectance. This configuration, however, makes achromatic display of black and white difficult. In particular, achromatic black color which has low reflectance may not be displayed.

The reflective LCD using birefringence of twisted nematic liquid crystal layer and polarizing film for color display, and the color LCD using birefringence of the liquid crystal layer and a retardation film do not use the color filter. Since these types of color LCDs eliminate the use of the color filter, reflectance for sufficient brightness is securable even if two polarizing films are used. However, since the display is colored by birefringence, multi gray levels and multicolor display such as 4096 colors in 16-step gradation or full color in 64-step gradation may theoretically be difficult. Color purity and color reproducibility range may also be narrow.

The reflective LCD in the black and white mode which uses two polarizing films may not be able to achieve high reflectance for the white mode.

The present invention aims to offer a reflective liquid crystal display device (LCD) which achieves bright white display, high contrast, and achromatic black and white display.

SUMMARY OF THE INVENTION

The reflective LCD of the present invention includes a liquid crystal cell in which a nematic liquid crystal layer is sealed between first and second substrates; a polarizing film disposed on the first substrate side of the liquid crystal cell; two retardation films consisting of a structural component having small chromatic dispersion in refractive index anisotropy disposed between the polarizing film and liquid crystal cell; and optical reflecting means disposed on the second substrate side.

A twisting angle of the nematic liquid crystal layer is from 45° to 90°, and a product of birefringence ΔnLC of the nematic liquid crystal layer and thickness dLC of the liquid crystal layer, ΔnLC–dLC, is from 0.20 to 0.30 Mm. The retardation value RF1 of the retardation film at the polarizing film side (a product of refractive index anisotropy and thickness of the retardation film) is from 0.23 μm to 0.28 μm. The retardation value RF2 of the retardation film at the liquid crystal cell side is from 0.13 μm to 0.18 μm. The direction normal to the film face of the two retardation films is determined as the z axis, and the direction of a slow axis is determined as the x axis in orthogonal coordinates (x, y, z). When a z coefficient Qz defined by Formula 1, using refractive indexes nx, ny, and nz to each axis direction in the above orthogonal coordinates, is from 0.3 to 1.0; a set of Formulae 2 to 4, or a set of Formula 5 to 7 is satisfied:

$$Qz = (nx-nz)/(nx-ny) \quad (1);$$

$$75° \leq \phi P \leq 95° \quad (2);$$

$$95° \leq \phi P - \phi F1 \leq 115° \quad (3)$$

$$155° \leq \phi P - \phi F2 \leq 175° \quad (4);$$

$$-15° \leq \phi P \leq 105° \quad (5);$$

$$-115° \leq \phi P - \phi F1 \leq -105° \quad (6);$$

$$-175° \leq \phi P - \phi F2 \leq -165° \quad (7);$$

where
- φP=angle of the absorption axis direction of the polarizing film;
- φF1=angle of the slow axis direction of the retardation film on the polarizing film side; and
- φF2=angle of the slow axis direction of the retardation film on the liquid crystal cell side.

All angles are measured relative to a reference line which is a bisector of a larger angle between the ordering direction of liquid crystal molecules closest to the first substrate and the ordering direction of liquid crystal molecules closest to the second substrate. A twisting direction of the nematic liquid crystal layer from the first substrate to second substrate is determined as a positive direction.

With this configuration, the reflective LCD of the present invention in the normally white mode achieves bright display and achromatic color change between back and white.

In particular, when the set of Formulae 2 to 4 is satisfied, it is preferable to set the angle φP of the absorption axis direction of the polarizing film from 90° to 120° or from 155° to 185°. This further achieves better characteristics with high contrast.

When the set of Formulae 5 to 7 is satisfied, it is preferable to set the angle φP of the absorption axis direction of the polarizing film from 0° to 30° or from 60° to 90°. This also achieves better characteristics with high contrast.

Furthermore, the reflective LCD of the present invention preferably sets the twisting angle of the nematic liquid crystal layer from 60° to 65°.

This further achieves better characteristics.

The z coefficient Qz of the retardation film at the polarizing film side in the reflective LCD of the present invention is preferably set from 0.3 to 0.7. This enables the achievement of the reflective LCD with less change in reflectance by viewing angles. From the same viewpoint, it is still preferable to set the z coefficient Qz for each of the two retardation films from 0.3 to 0.7.

The reflective LCD of the present invention achieves bright display by collecting external light around the panel with provision of a scattering film on the first substrate side. This scattering film is preferably disposed between the retardation film and first substrate in order to suppress blurring of display images. In addition, a forward-scattering film is preferably used as the scattering film. As for the forward-scattering film, it is preferable to use a material which has strong forward-scattering characteristics with almost no backward-scattering characteristics.

In the reflective LCD of the present invention, the optical reflecting means preferably contains a metal at least selected from aluminum and silver. Preferably, the metal electrode also functions as an electrode on the second substrate side.

This metal electrode, particularly in case of LCDs having aforementioned scattering film, preferably has a mirror-finished surface. This enables to reduce disorder in the ordering direction of liquid crystal to achieve natural visual recognition. On the other hand, in case of reflective LCDs which do not use the scattering film, it is preferable to dispose a scattering layer on the metal electrode or add diffusing reflectivity to the metal electrode itself. To add diffusing reflectivity to the metal electrode, its surface may preferably be roughened to achieve an average tilt angle of 3° to 12°. This enables the achievement of the reflective LCD with natural visual recognition.

The reflective LCD of the present invention may also employ a transparent substrate for the second substrate, and dispose the optical reflecting means such as a diffusing reflector outside of the transparent substrate. In this case, a transparent electrode is also used for the second substrate. In this configuration, an air layer is preferably created between the transparent substrate and diffusing reflector. This further increases the diffusing effect.

Also in the reflective LCD of the present invention, a color filter is disposed to configure the reflective color LCD, or without color filter to configure the reflective LCD in the black and white mode. In the black and white mode, further bright display is achievable particularly with high reflectance for white. In the color mode, for example, full color 64-step gradation is achievable with the characteristics of achromatic color change between black and white. Provision of a nonlinear device at the second substrate side enables to further achieve an active matrix reflective LCD driven by the nonlinear device such as TFT disposed in matrix. In this case, an insulative flattening film is formed on the nonlinear device, and the nonlinear device and the electrode at the second substrate side are electrically connected through a contact hole created on this flattening film. This enables the achievement of the reflective LCD with high reflectance and high aperture ratio which can be driven actively.

DESCRIPTION OF THE PREFERRED EMBODIMENT

Exemplary embodiments of the present invention are described with reference to the drawings.

First Exemplary Embodiment

A reflective LCD in a first exemplary embodiment of the present invention is described below.

Figure 1:
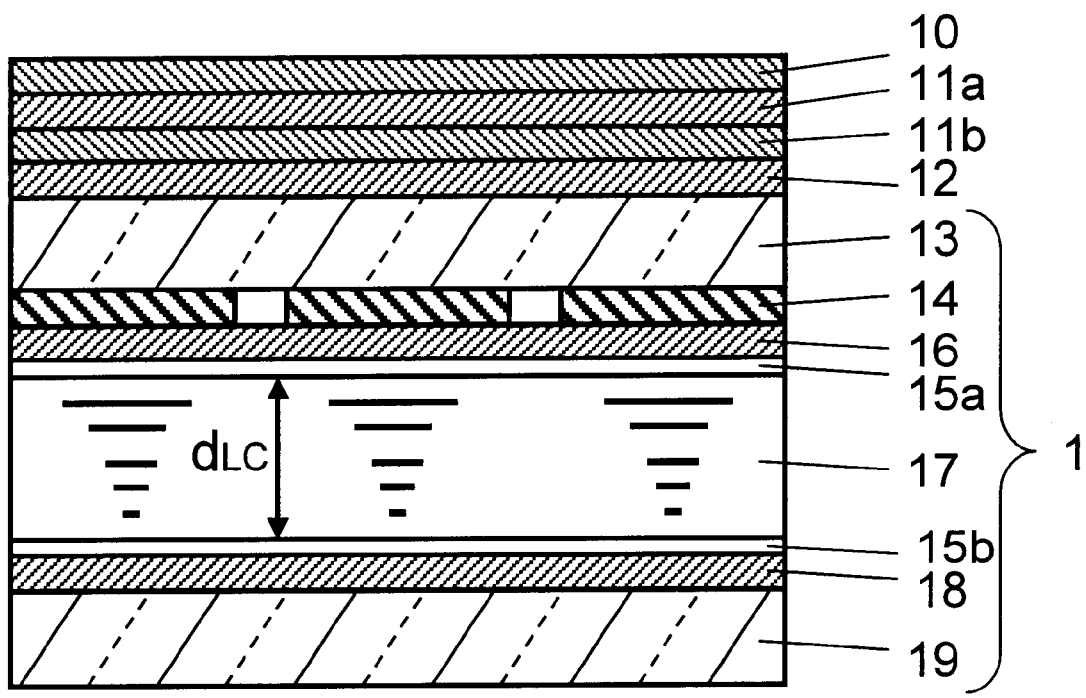
FIG. 1 is a sectional view of a reflective liquid crystal display device in accordance with an exemplary embodiment of the present invention.
Figure 2:
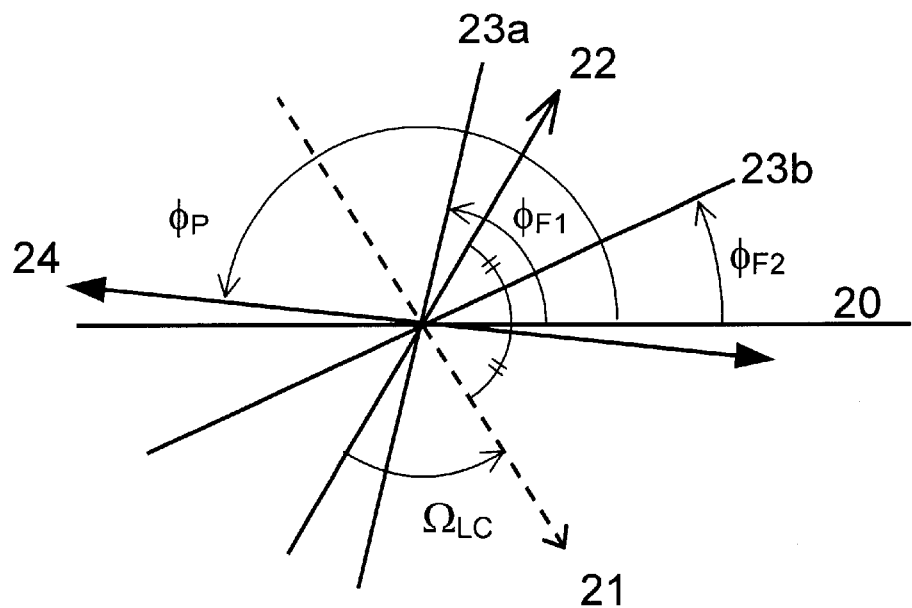
FIG. 2 is an optical configuration of the reflective liquid crystal display device in accordance with the exemplary embodiment of the present invention.

FIG. 1 is a sectional view of the reflective LCD in the first exemplary embodiment of the present invention. FIG. 2 is an optical configuration of the reflective LCD in the first exemplary embodiment seen from the side of an upper substrate. Here, a bisector of a larger angle of the ordering direction 21 of liquid crystal molecules closest to a lower substrate 19 and the ordering direction 22 of liquid crystal molecules closest to an upper transparent substrate 13 is determined as a reference line 20 for describing a range of angles. A twisting direction of liquid crystal indicated by ΩLC (a twisting direction of liquid molecules from the upper transparent substrate 13 to lower substrate 19) is determined as a positive direction of each angle. An angle of the absorption axis 24 of a polarizing film 10 is denoted by φP, an angle of the slow axis 23a of a norbornene derivative retardation film 11a at the polarizing film side is denoted by φF1, and an angle of the slow axis 23b of a norbornene derivative retardation film 11b at the liquid crystal cell side is denoted by φF2.

This reflective LCD operates in the normally white mode. This is a mode which has the maximum reflectance (white display) when voltage is not applied to the liquid crystal layer, and reflectance reduces (black display) as applied voltage increases.

The reflective LCD in the first exemplary embodiment is manufactured as described below. The upper transparent substrate 13 and lower substrate 19 are made of non-alkali glass substrates (e.g. Corning 1737). Red, green and blue stripes of pigment dispersion type are photolithographically formed as a color filter layer 14 on the upper transparent substrate 13, and indium tin oxide is formed as a pixel electrode of a transparent electrode 16 on the color filter layer 14. Titanium with a thickness of 80 nm is deposited on the lower substrate 19, and then aluminum with a thickness of 200 nm is deposited to form a metal reflective electrode 18 of the specular reflection type.

A polyimide solution containing 5 weight percentage of γ-butyrolactone is printed on the transparent electrode 16 and metal reflective electrode 18, and cured at 250° C. Then, they are rotationally rubbed with a rayon cloth to form the orientation layers 15a and 15b with a predetermined twisting angle.

Thermosetting sealing resin (e.g. LC STRUCTBOND by Mitsui Chemicals, Inc.) in which 1.0 weight percentage of glass fiber with a predetermined diameter is mixed is printed on the periphery of the upper transparent substrate 13. Resin beads with a predetermined diameter are distributed at the rate of 100 to 200 pieces/mm$^2$ on the lower substrate 19. The upper transparent substrate 13 and lower substrate 19 are pasted, and the sealing resin is cured at 150° C. Then, liquid crystal in which fluoro ester nematic liquid crystal having birefringence (refractive index anisotropy) ΔnLC of 0.08 and chiral liquid crystal are mixed in a way to achieve a chiral pitch of 80 µm. This mixed liquid crystal is vacuum injected, and the inlet is sealed with UV curing resin and cured by applying UV ray.

An isotropic forward-scattering film is attached on the upper transparent substrate 13 of the liquid crystal cell, as formed above, as a scattering film layer 12. The norbornene derivative retardation films 11a and 11b are attached in a way that each slow axis creates a predetermined angle. Then, a neutral glare polarizing film (e.g. SQ-1852AP by Sumitomo Chemical Co., Ltd.) after an antiglare (AG) and an antireflection (AR) treatment is attached as the polarizing film 10 in such a way that its absorption axis creates a predetermined angle.

For the retardation films 11a and 11b, an uniaxial optical anisotropic film showing refractive index anisotropy within the film face is used. More specifically, the retardation film used in the first exemplary embodiment is a film which satisfies the following relation:

$$nx>ny=nz;$$

where
- z: Direction normal to the film;
- x: Slow axis; and
- nx, ny, nz: Refractive index along the direction of each axis in the orthogonal coordinates (x, y, z).

The refractive index anisotropy (birefringence) of this retardation film is defined by Δn=nx−ny. Its retardation value is expressed by the product of Δn and film thickness. Hereafter, retardation values of the retardation films 11a and 11b are indicated as RF1 and RF2.

The refractive index anisotropy Δn of the retardation films 11a and 11b generally show dependence on wavelength (chromatic dispersion). If the chromatic dispersion of Δn is large, unwanted coloring occurs in achromatic black and white displays. If Δn at wavelengths 550 mn, 450 mn, and 650 mn are respectively Δn (550), Δn (450), and Δn (650), the following relations are preferably satisfied for displaying achromatic black and white without any coloring:

$$0.95<\Delta n(450)/\Delta n(550)<1.05;$$

and $$0.95<\Delta n(650)/\Delta n(550)<1.05.$$

The retardation films in this exemplary embodiment are configured with a structural component satisfying the above conditions.

Since the thickness of the liquid crystal layer is set to dLC=3.0 µm, retardation of the liquid crystal layer is ΔnLC·dLC=0.24 µm. Retardations of two retardation films are respectively set to RF1=0.27 µm and RF2=0.14 µm. The twisting angle ΩLC of the liquid crystal layer is set to ΩLC=63.0°. The direction of the absorption axis φP of the polarizing film is set to satisfy φP−φF1=105.0° and φP−φF2=165.0°.

A range of reflective LCDs with different φP under the above conditions are manufactured, and optical characteristics of these LCDs in the reflective mode are measured. Results show that a reflective LCD in the normally white mode with high contrast is achieved when φP is from 75° to 195°. The reason is that luminance in black can be made low when the absorption axis of the polarizing film is set to the above angles.

In particular, when φP is from 90° to 12° or from 155° to 185°, it is further preferable for satisfying the reflective LCD in the normally white mode for achromatic black and white display with high contrast.

Next, differences in characteristics when ΔnLC·dLC is changed are examined. Achromatic black with low reflectance and achromatic white with high reflectance are achieved when ΔnLC·dLC is from 0.20 µm to 0.30 µm.

Next, differences in characteristics when the twisting angle ΩLC of the liquid crystal layer is changed are examined. The first exemplary embodiment of the present invention demonstrates satisfactory characteristics when the twisting angle ΩLC is from 45° to 90°. In particular, further satisfactory characteristics are confirmed when the twisting angle ΩLC is from 60° to 65°.

Measurement results of optical characteristics when φP=120.0° are particularly described below. The reflectance is measured against a complete diffusing light source.

Figure 3:
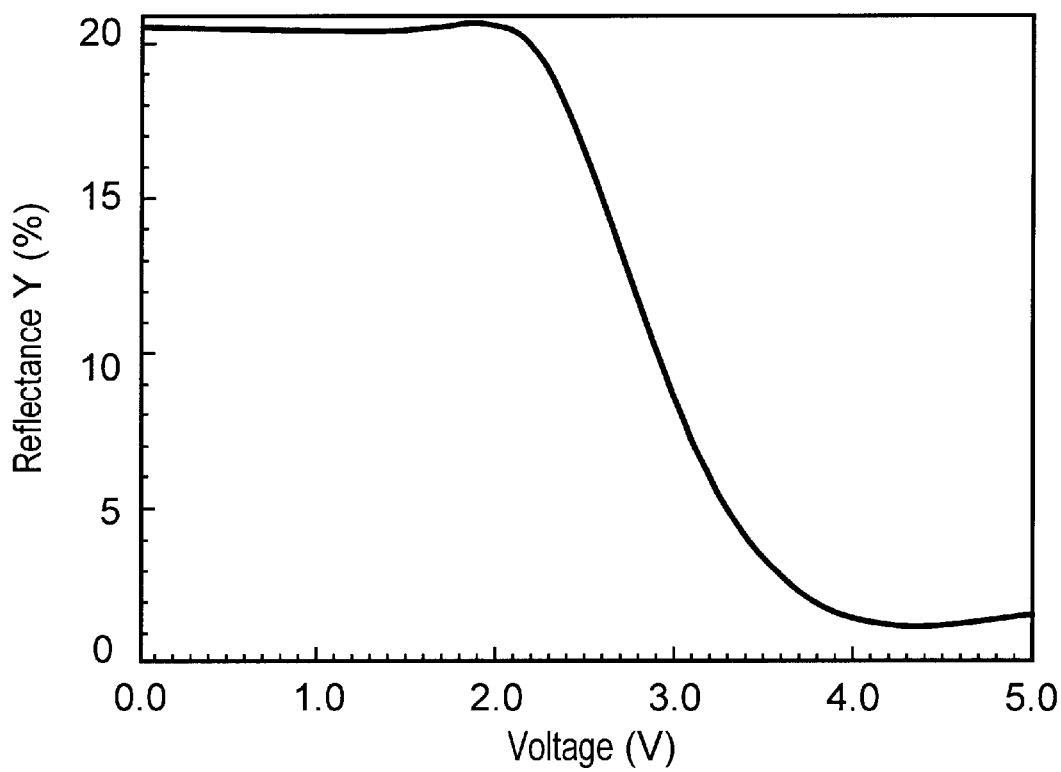
FIG. 3 illustrates the relation between the reflectance and applied voltage of the reflective liquid crystal display device in accordance with the exemplary embodiment of the present invention.

FIG. 3 illustrates the relation of the reflectance and applied voltage of the reflective LCD in the first exemplary embodiment. Expressed by front characteristics, which is the characteristics observed from the direction normal to the substrate, the white reflectance converted to Y level is 19.8%, and contrast is 15.1. Achromatic colors also change from black to white, achieving full color 64-step gradation display.

The reflective LCD with the above configuration without the color filter layer 14 demonstrates contrast of 15.6 and white reflectance converted to Y level of 35.5% in front characteristics.

In the above configuration, the scattering film 12 is disposed between the retardation film 11b and upper transparent substrate 13. However, the same characteristics are achievable when the scattering film 12 is disposed on the polarizing film 10, between the polarizing film 10 and retardation film 11a, or between the retardation film 11a and retardation film 11b.

The main structure of the retardation film in the first exemplary embodiment is a norbornene derivative material. Films configured with other materials including polyvinyl alcohol is also applicable.

The first exemplary embodiment also uses the metal reflective electrode containing aluminum as the reflective electrode. However, the effects of the present invention are not limited to this material. The same effects are achievable with the metal reflective electrode containing materials such as silver.

Second Exemplary Embodiment

A reflective LCD in a second exemplary embodiment of the present invention is described next.

Figure 4:
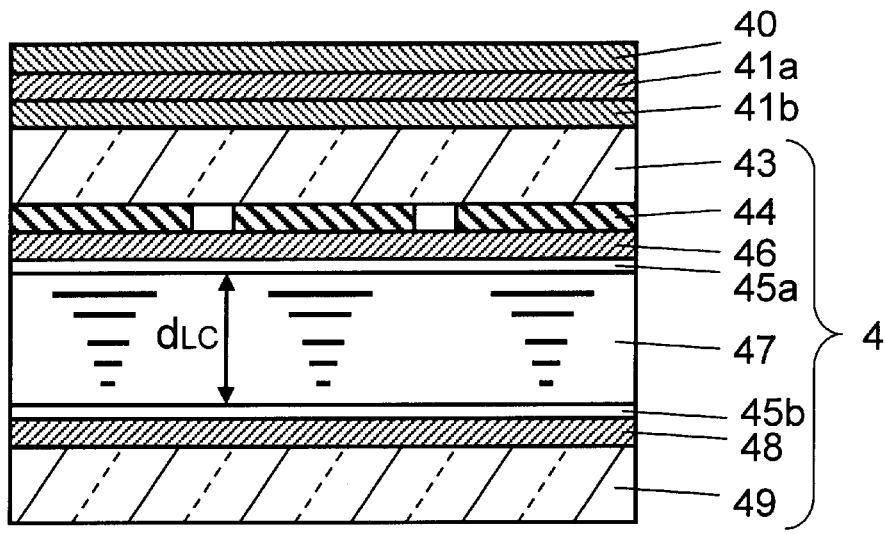
FIG. 4 is a sectional view of the reflective liquid crystal display device in accordance with another exemplary embodiment of the present invention.

FIG. 4 is a sectional view of the reflective LCD in the second exemplary embodiment. A detail which differs from the first exemplary embodiment is that a metal reflective electrode 48 of the diffusing (scattering) reflection type is used instead of the metal reflective electrode 18 of the specular reflection type.

The optical configuration of the second exemplary embodiment is the same as that of the first exemplary embodiment shown in FIG. 2.

The reflective LCD in the second exemplary embodiment is manufactured as described below. An upper transparent substrate 43 and lower substrate 49 are made of non-alkali glass substrates (e.g. Corning 1737). Red, green and blue stripes of pigment dispersion type are photolithographically formed as a color filter layer 44 on the upper transparent substrate 43, and indium tin oxide is formed as a pixel electrode of a transparent electrode 46. Titanium with thickness of 80 nm is deposited on the lower substrate 49, and then aluminum with thickness of 200 nm is deposited. The surface is then roughened to an average tilt angle of 3° to 12° to form the metal reflective electrode 48 of the diffusing (scattering) reflection type.

Polyimide solution containing 5 weight percentage of γ-butyrolactone is printed on the transparent electrode 46 and metal reflective electrode 48, and cured at 250° C. Then, they are rotationally rubbed with a rayon cloth to form orientation layers 45a and 45b with a predetermined twisting angle.

Thermosetting sealing resin (e.g. LC STRUCTBOND by Mitsui Chemicals, Inc.) in which 1.0 weight percentage of glass fiber with a predetermined diameter is mixed is printed on the periphery of the upper transparent substrate 43. Resin beads with a predetermined diameter are distributed at the rate of 100 to 200 pieces/mm$^2$ on the lower substrate 49. The upper transparent substrate 43 and lower substrate 49 are pasted, and the sealing resin is cured at 150° C. Then, liquid crystal in which fluoro ester nematic liquid crystal having birefringence ΔnLC of 0.08 and chiral liquid crystal are mixed in a way to achieve a chiral pitch of 80 μm. This mixed liquid crystal is vacuum injected, and the inlet is sealed with UV curing resin and cured by applying UV ray.

Norbornene retardation films 41a and 41b are attached on the upper transparent substrate 43 of the liquid crystal cell as formed above in a way that each slow axis creates a predetermined angle. Then, a neutral glare polarizing film (SQ-1852AP by Sumitomo Chemical Co., Ltd.) after antiglare (AG) and antireflection (AR) treatment is attached as a polarizing film 40 in a way that its absorption axis creates a predetermined angle.

For the retardation films 41a and 41b, an uniaxial optical anisotropic film which satisfies nz=nx>ny, same as that in the first exemplary embodiment, and has small chromatic dispersion in Δn is used.

Since the thickness of the liquid crystal layer is set to dLC=3.0 μm, retardation of the liquid crystal layer is ΔnLC·dLC=0.24 μm. Retardations of two retardation films are respectively set to RF1=0.27 μm and RF2=0.14 μm. The twisting angle of the liquid crystal layer is set to ΩLC=63.0°. The direction of the absorption axis ØP of the polarizing film is set to satisfy φP−φF1=105.0° and ØP−ØF2=165.0°.

A range of reflective LCDs with different φP under the above conditions are manufactured, and optical characteristics of these LCDs in the reflective mode are measured. Results show that a reflective LCD in the normally white mode with high contrast is achieved when φP is from 75° to 195°. The reason is that luminance in black can be made low when the absorption axis of the polarizing film is set to the above angles.

In particular, when φP is from 90° to 120° or from 155° to 185°, it is further preferable for satisfying the reflective LCD in the normally white mode with high contrast for achromatic black and white display.

Differences in characteristics when ΔnLC·dLC is changed are also examined. Achromatic black with low reflectance and achromatic white with high reflectance are achieved when ΔnLC·dLC is from 0.20 μm to 0.30 μm.

Next, differences in characteristics when the twisting angle ΩLC of liquid crystal is changed are examined. The second exemplary embodiment of the present invention also demonstrates satisfactory characteristics when the twisting angle ΩLC is from 45° to 90°. In particular, further satisfactory characteristics are confirmed when the twisting angle ΩLC is from 60° to 65°.

Measurement results of optical characteristics when φP=120.0° are particularly described below. The reflectance is measured against a complete diffusing light source.

The white reflectance converted to Y level is 18.6%, and contrast is 15.1 in the front characteristics. Achromatic colors also change from black to white, achieving full color 64-step gradation display.

The reflective LCD with the above configuration without the color filter layer 44 demonstrates contrast of 14.8 and white reflectance converted to Y level of 34.9% in front characteristics.

The second exemplary embodiment uses the metal reflective electrode containing aluminum as the reflective electrode. However, the effects of the present inventions are not limited to this material. The same effects are achievable with the metal reflective electrode containing materials such as silver.

Third Exemplary Embodiment

A reflective LCD in a third exemplary embodiment of the present invention is described below.

The manufacturing method and configuration of the reflective LCD in the third exemplary embodiment are the same as those of the first exemplary embodiment. The optical configuration of the third exemplary embodiment is also the same as that of the first exemplary embodiment shown in a sectional view of FIG. 1 and FIG. 2.

Same as the first exemplary embodiment, the thickness of the liquid crystal layer is set to dLC=3.0 μm, and thus retardation of the liquid crystal layer is ΔnLC·dLC=0.24 μm. Retardations of two retardation films are respectively RF1=0.27 μm and RF2=0.14 μm. The twisting angle of the liquid crystal layer is ΩLC=63.0°. An angle of the absorption axis φP of the polarizing film is set to satisfy φP−φF1=−110.0° and φP−φF2=−170.0°. A range of reflective LCD with different φP under the above conditions are manufactured, and optical characteristics of these LCDs in the reflective mode are measured. Results show that a reflective LCD in the normally white mode with high contrast is achieved when φP is from −15° to 105°. The reason is that luminance in black can be made low when the absorption axis of the polarizing film is set to the above directions.

In particular, when φP is from 0° to 30° or from 60° to 90°, it is preferable for satisfying the reflective LCD in the normally white mode with high contrast for achromatic black and white display.

Next, differences in characteristics when ΔnLC·dLC is changed are examined. Achromatic black with low reflectance and achromatic white with high reflectance are achieved when ΔnLC·dLC is from 0.20 μm to 0.30 μm.

Next, differences in characteristics when the twisting angle ΩLC is changed are examined. The third exemplary embodiment of the present invention demonstrates satisfactory characteristics when the twisting angle ΩLC is from 45° to 90°. In particular, further satisfactory characteristics are confirmed when the twisting angle ΩLC is from 60° to 65°.

Measurement results of optical characteristics when φP=75.0° are particularly described below. The reflectance is measured against a complete diffusing light source.

Figure 5:
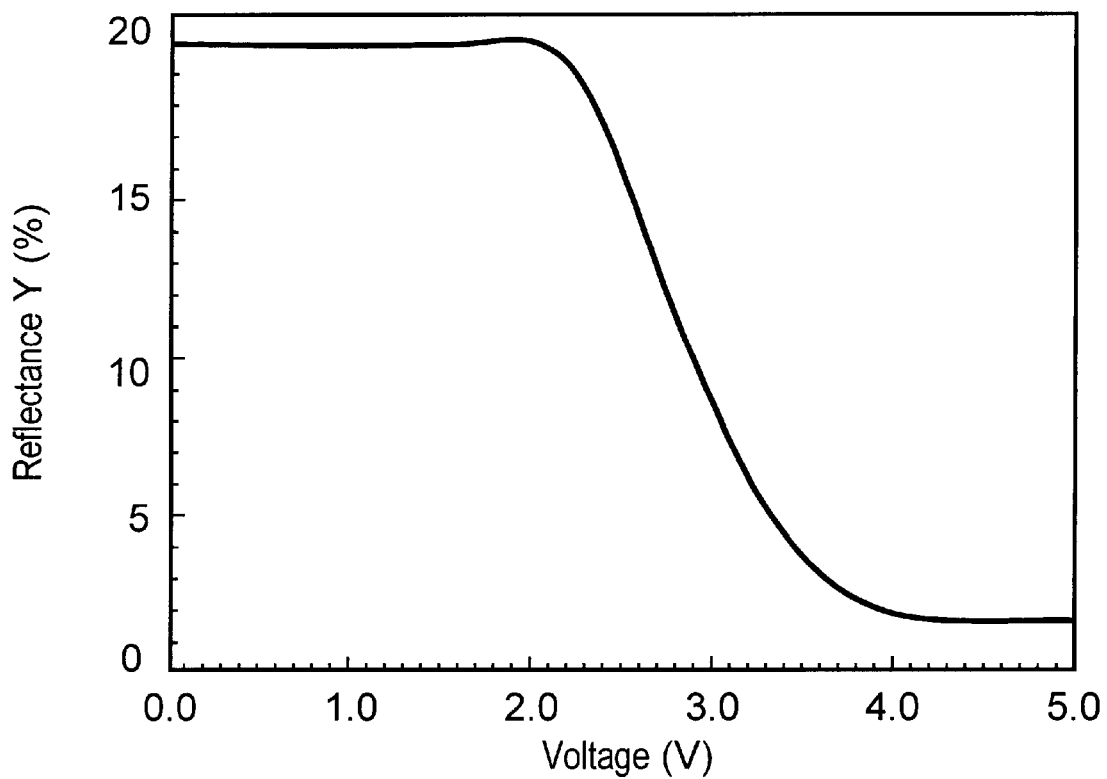
FIG. 5 illustrates the relation of the reflectance and applied voltage in the liquid crystal display device in accordance with another exemplary embodiment of the present invention.

FIG. 5 illustrates the relation of the reflectance and applied voltage of the reflective LCD in the third exemplary embodiment. The white reflectance converted to Y level is 19.2%, and contrast is 15.6 in front characteristics. Achromatic colors also change from black to white, achieving full color 64-step gradation display.

The reflective LCD with the above configuration without the color filter layer 14 demonstrates contrast of 15.2 and white reflectance converted to Y level of 34.8% in the front characteristics.

In the above configuration, the scattering film 12 is disposed between the retardation film 11b and upper transparent substrate 13. However, the same characteristics are achievable when the scattering film 12 is disposed on the polarizing film 10, between the polarizing film 10 and retardation film 11a, and between the retardation film 11a and retardation film 11b.

The third exemplary embodiment uses the metal reflective electrode containing aluminum as a reflective electrode. However, effects of the present invention are not limited to this material. For example, the same effects are achievable when a metal reflective electrode containing silver is used.

Fourth Exemplary Embodiment

A reflective LCD in a fourth exemplary embodiment of the present invention is described next.

The manufacturing method and configuration of the reflective LCD in the fourth exemplary embodiment are basically the same as those of the first exemplary embodiment. The reflective LCD in the fourth exemplary embodiment has the optical configuration of the reflective LCD shown in a sectional view of FIG. 1 and FIG. 2.

In this exemplary embodiment, a norbornene derivative film having the refractive index nz in the z axis direction also different from ny, a so-called biaxial optical anisotropy, is used as a retardation film. A degree of anisotropy along the z axis is expressed with a z coefficient Qz defined by Formula 1:

$$Qz=(nx-nz)/(nx-ny) \qquad (1).$$

In case of a film having uniaxial optical anisotropy, Qz=1 since nz=ny.

Figure 6A:
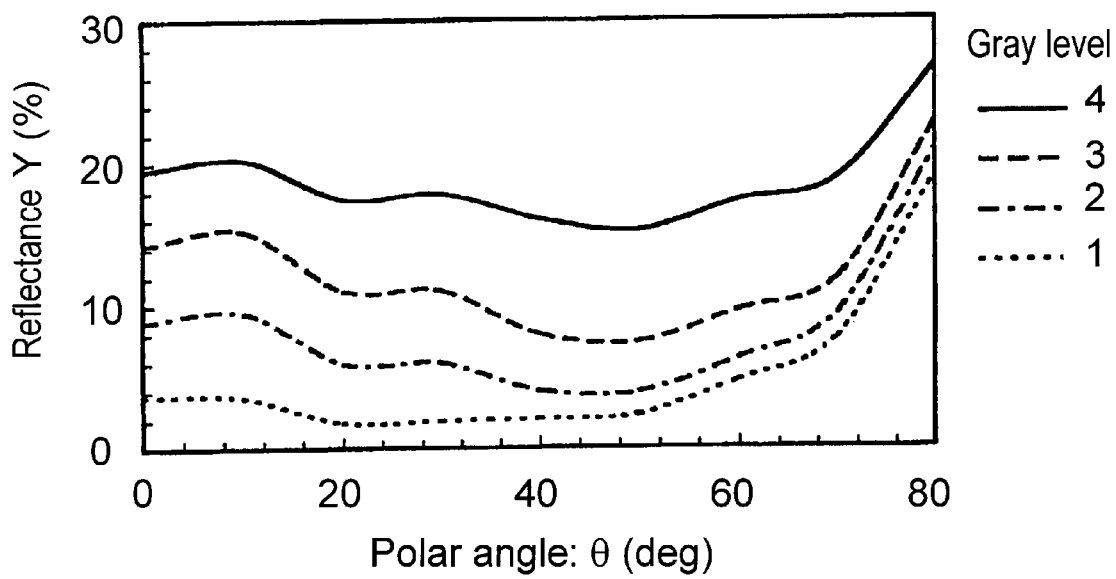
FIG. 6A and FIG. 6B illustrate the reflectance against changes in a viewing angle to the rightwards for different z coefficients.
Figure 6B:
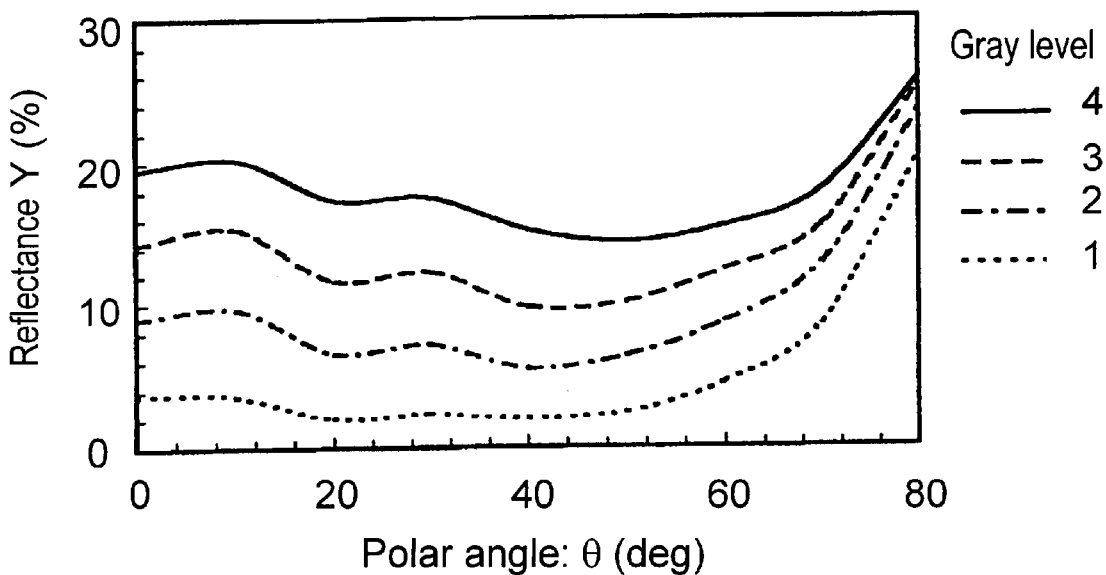

FIGS. 6A and 6B show characteristics of the reflectance of LCD against changes in a viewing angle to the right in accordance with a difference in z coefficient. Here, the direction normal to the substrate is determined as 0°, and a viewing angle tilted to the right is determined as a polar angle θ. The LCD in the fourth exemplary embodiment adopts the normally white mode, and thus voltage applied to the liquid crystal layer is the largest at the gray level 1, and smallest at the gray level 4.

In the fourth exemplary embodiment, the liquid crystal layer is formed into the thickness of dLC=3.0 μm, and thus ΔnLC·dLC=0.24 μm. Retardation values of the two retardation films are respectively RF1=0.27 μm and RF2=0.14 μm. Other conditions are set to QLC=63.0°, φP=105.0°, φP−φF1=105.0°, and φP−φF2=165.0°. The z coefficient Qz (1) of the retardation film 11a at the polarizing film side and z coefficient Qz (2) of the retardation film 11b at the liquid crystal cell side are changed to examine differences in characteristics. As a result, satisfactory viewing characteristics including small changes in reflectance, contrast, and colors against changes in viewing angles are achieved when both Qz (1) and Qz (2) are from 0.3 to 1.0.

In particular, changes in reflectance against viewing angles at applying voltage for four gray levels between white and black are examined using two combinations made when Qz (1) and Qz (2) are respectively 0.5 or 1.0. It is apparent from FIGS. 6A and 6B that dependence on viewing angle is lower when the z coefficient Qz is smaller, and satisfactory reflectance characteristics without any grayscale inversion is achievable. In particular, further satisfactory viewing angle characteristics are achievable when Qz (1) is from 0.3 to 0.7. Still furthermore satisfactory viewing angle characteristics are achievable when both Qz (1) and Qz (2) are from 0.3 to 0.7.

Fifth Exemplary Embodiment

A reflective LCD in a fifth exemplary embodiment of the present invention is described next.

Figure 7:
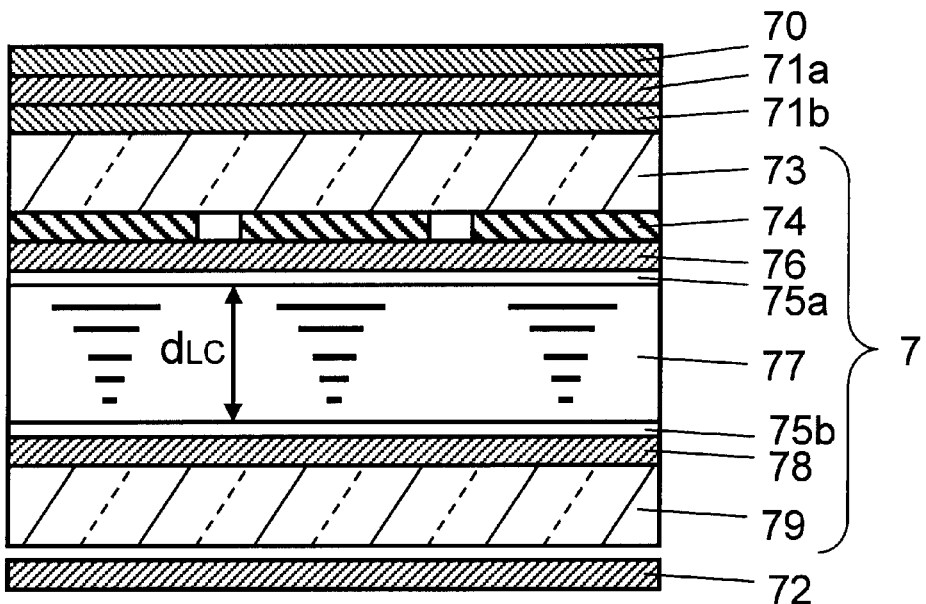
FIG. 7 is a sectional view of a reflective liquid crystal display device in accordance with another exemplary embodiment of the present invention.

FIG. 7 is a sectional view of a fifth exemplary embodiment of the present invention. In this exemplary embodiment, a diffusing reflector 72 is disposed outside a liquid crystal cell 7, and a transparent substrate is used as a lower substrate 79 (hereafter referred to as "lower transparent substrate 79") of the liquid crystal cell 7. An electrode 78 in the lower transparent substrate 79 is also a transparent electrode. Other configurations are the same as those of the first exemplary embodiment.

The optical configuration of the reflective LCD in this exemplary embodiment is also the same as that illustrated in FIG. 2.

The reflective LCD in the fifth exemplary embodiment is manufactured as described below. The upper transparent substrate 73 and lower transparent substrate 79 are made of non-alkali glass substrates (e.g. Corning 1737). Red, green and blue stripes of pigment dispersion type are photolithographically formed as a color filter layer 74 on the upper transparent substrate 73.

Indium tin oxide are formed as a pixel electrode of transparent electrodes 76 and 78 on the color filter layer 74 and the lower transparent substrate 79 respectively. Polyimide solution containing 5 weight percentage of γ-butyrolactone is printed on the transparent electrodes 76 and 78, and cured at 250° C. Then, they are rotationally rubbed with a rayon cloth to form the orientation layers 75a and 75b with a predetermined twisting angle.

Thermosetting sealing resin (e.g. LC STRUCTBOND by Mitsui Chemicals, Inc.) in which 1.0 weight percentage of glass fiber with a predetermined diameter is mixed is printed on the periphery of the upper transparent substrate 73. Resin beads with a predetermined diameter are distributed at the rate of 100 to 200 pieces/mm$^2$ on the lower transparent substrate 79. The upper transparent substrate 73 and lower transparent substrate 79 are pasted, and the sealing resin is cured at 150° C. Then, liquid crystal in which fluoro ester nematic liquid crystal having ΔnLC=0.08 and chiral liquid crystal are mixed in a way to achieve a chiral pitch of 80 μm. This mixed liquid crystal is vacuum injected, and the inlet is sealed with UV curing resin and cured by applying UV ray.

Norbornene retardation films 71a and 71b are attached on the upper transparent substrate 73 of the liquid crystal cell in a way that each slow axis creates a predetermined angle. Then, a neutral glare polarizing film (SQ-1852AP by Sumitomo Chemical Co., Ltd.) after antiglare (AG) and antireflection (AR) treatment is attached as a polarizing film 70 in a way that its absorption axis or transmittance axis creates a predetermined angle. For the retardation films 71a and 71b, an uniaxial optical anisotropic film which shows Qz=1, same as that in the first exemplary embodiment, and has small chromatic diffusion in Δn is used.

A diffusion reflector 72 made of silver is disposed underneath the lower transparent substrate 79.

In the fifth exemplary embodiment, the thickness dLC of the liquid crystal layer is formed to dLC=3.0 μm, and thus ΔnLC·dLC=0.24 μm. Retardations of two retardation films are respectively set to RF1=0.27 μm, and RF2=0.14 μm. Other conditions are set to ΩLC=63.0°, φP=105.0°, φP−φF1=105.0°, and φP−φF2=165.0°.

When the transparent substrate and transparent electrode are used for both upper and lower substrates, and the diffusion reflector is used underneath the lower substrate as described above, a slight blurring in images due to influence of parallax is noticed, but a reflective LCD with natural change in viewing characteristics is achieved.

Measurements of the front characteristics show white reflectance converted to Y level of 16.5% and contrast of 13.9.

Front characteristics of the reflective LCD with the above configuration and without color filter layer 74 show white reflectance converted to Y level of 33.2% and contrast of 14.0.

An air layer is provided between the diffusion reflector 72 and the lower transparent substrate 79 without completely bonding them with adhesive. This enables the achievement of further natural viewing characteristics by increased diffusion effect generated by difference in refractive index between resin, which is about 1.6, and air, which is about 1.0.

The fifth exemplary embodiment uses silver for the diffusion reflector, however, the same effects are achievable with an aluminum diffusion reflector.

Sixth Exemplary Embodiment

A reflective LCD in a sixth exemplary embodiment is described next.

Figure 8:
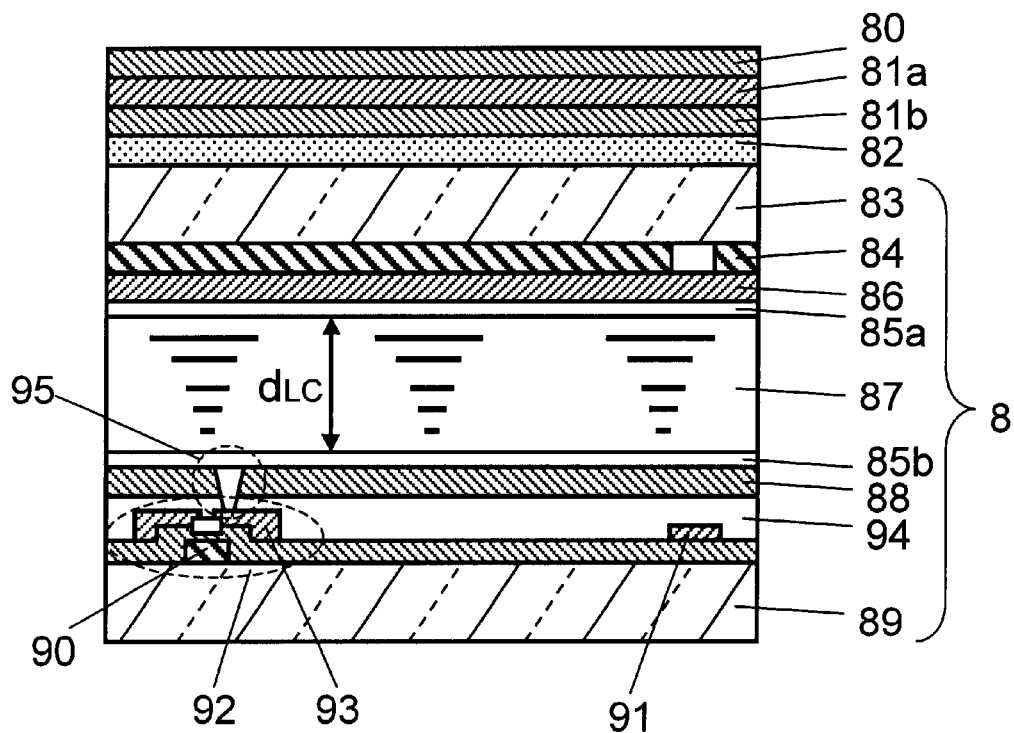
FIG. 8 is a sectional view of a reflective liquid crystal display device in accordance with another exemplary embodiment of the present invention.

FIG. 8 is a sectional view of the reflective LCD in the sixth exemplary embodiment. Same as other exemplary embodiments, the reflective LCD in the sixth exemplary embodiment includes a polarizing film 80, norbornene derivative retardation films 81a and 81b, scattering film layer 82, upper transparent substrate 83, color filter layer 84, orientation layers 85a and 85b, transparent electrode 86, liquid crystal layer 87, metal reflective electrode 88, and lower substrate 89. The sixth exemplary embodiment further includes an active matrix array on the lower substrate 89 which includes a gate electrode 90, source line 91, thin film transistor device (TFT) 92, drain electrode 93, and flattening film 94. The metal reflective electrode 88 is connected to a non-linear switching device (TFT) underneath the flattening film 94 through a contact hole 95 for active driving.

An optical configuration of the reflective LCD in the sixth exemplary embodiment is the same as that shown in FIG. 2.

The reflective LCD in the sixth exemplary embodiment is manufactured as described below. The upper transparent substrate 83 and lower substrate 89 are made of non-alkali glass substrates (e.g. Corning 1737). Red, green and blue stripes of pigment dispersion type are photolithographically formed as the color filter layer 84 on the upper transparent substrate 83, and indium tin oxide is formed as a pixel electrode of the transparent electrode 86 on the color filter layer 84.

The gate electrode 90 made of aluminum and tantalum and the source electrode 91 and drain electrode 93 made of titanium and aluminum using a predetermined method are disposed in matrix on the lower substrate 89. A TFT device 92 made of amorphous silicon is formed at each cross section of the gate electrode 90 and source electrode 91.

Positive photosensitive acrylic resin (e.g. FVR by Fuji Chemical Industries, Ltd.) is applied on an entire face of the lower substrate 89 on which the above non-linear device is formed to create the flattening film 94. Then, using a predetermined photo mask, UV ray is applied to the drain electrode 93 to create the contact hole 95. Titanium is then deposited to 80 nm thick, and then aluminum to 200 nm thick for forming the metal reflective electrode 88 of the specular reflection type.

Polyimide solution containing 5 weight percentage of γ-butyrolactone is printed on the transparent electrode 86 and metal reflective electrode 88, and cured at 250° C. Then, they are rotationally rubbed with a rayon cloth to form the orientation layers 85a and 85b with a predetermined twisting angle.

Thermosetting sealing resin (e.g. LC STRUCTBOND by Mitsui Chemicals, Inc.) in which 1.0 weight percentage of glass fiber with a predetermined diameter is mixed is printed on the periphery of the upper transparent substrate 83. Resin beads with a predetermined diameter are distributed at the rate of 100 to 200 pieces/mm$^2$ on is the lower substrate 89. The upper transparent substrate 83 and lower substrate 89 are pasted, and the sealing resin is cured at 150° C. Then, liquid crystal in which fluoro ester nematic liquid crystal having ΔnLC=0.08 and a predetermined amount of chiral liquid crystal are mixed. This mixed liquid crystal is vacuum injected, and the inlet is sealed with UV curing resin and cured by applying UV ray.

An isotropic forward-scattering film is attached on the upper transparent substrate 83 of the liquid crystal cell, as formed above, as the scattering film layer 82. Norbornene retardation films 81a and 81b are attached in a way that each slow axis creates a predetermined angle. Then, a neutral glare polarizing film (SQ-1852AP by Sumitomo Chemical Co., Ltd.) after antiglare (AG) and antireflection (AR) treatment is attached as the polarizing film 80 in a way that its absorption axis or transmittance axis creates a predetermined angle. For the retardation films 81a and 81b, an uniaxial optical anisotropic film having Qz=1, same as the first exemplary embodiment, is used.

The thickness of the liquid crystal layer in the sixth exemplary embodiment is set to dLC=3.0 μm, and thus ΔnLC·dLC=0.24 μm. Retardations of two retardation films are respectively set to RF1=0.27 μm and RF2=0.14 μm. Other conditions are set to QLC=63.0°, φP=105.0°, φP−φF1=105.0° and φP−φF2=165.0°.

As for optical characteristics, the LCD in the sixth exemplary embodiment achieves a full color 64-step gradation display by active driving. The formation of the metal reflective electrode on the flattening film achieves as high aperture ratio as 97% even with active matrix. The front characteristics show white reflectance converted to Y level of 19.4%, which is almost the same level as the first exemplary embodiment, and contrast of 15.8.

Not only in the sixth exemplary embodiment, but in all exemplary embodiments, a reflective LCD for active driving is achievable in accordance with a method described in this exemplary embodiment by forming a non-linear device such as TFT on a lower substrate. As for non-linear devices, two-terminal devices (e.g. MIM and thin film diode) and polysilicon TFT may also be used, as well as amorphous silicon TFT, for achieving the same effect.

Accordingly, the present invention offers a reflective LCD in the normally white mode which achieves bright and high contrast, and achromatic changes between black and white.

What is claimed is:

1. A reflective liquid crystal display device comprising:
   a liquid crystal cell comprising a nematic liquid crystal layer sealed between a first transparent and a second substrate, said nematic liquid crystal layer having a thickness of dLC and birefringence of ΔnLC;
   a polarizing film disposed on a side of said first substrate;
   two retardation films disposed between said polarizing film and said liquid crystal cell; and
   optical reflecting means disposed on a side of said second substrate; characterized in that
   said two retardation films comprise a structural component having a refractive index anisotropy satisfying 0.95<Δn(450)/Δn(550)<1.05 and 0.95<Δn(650)/Δn(550)<1.05; said refractive index anisotropy being defined by Δn=nx−ny, using refractive indexes nx, ny, and nz in each direction in orthogonal coordinates (x, y, z) in which the z axis is determined as a direction normal to a film face and the x axis is determined as a direction of a slow axis; and said refractive index anisotropy of said structural component being Δn (550), Δn (450), and Δn (650) respectively when wavelengths are 550 nm, 450 nm and 650 nm;
   said nematic liquid crystal layer has a twisting angle from 45° to 90°, and a product ΔnLC·dLC of a birefringence ΔnLC and thickness dLC of said nematic liquid crystal layer is from 0.20 to 0.30 μm;
   a retardation value RF1 of said first retardation film on said polarizing film side (the product of Δn and thickness of said retardation film) is from 0.23 μm to 0.28 μm;
   a retardation value RF2 of said second retardation film on said liquid crystal cell side is from 0.13 μm to 0.18 μm;
   a z coefficient Qz of said two retardation films defined by Formula 1 is from 0.3 to 1.0; and
   said reflective liquid crystal device satisfies one of sets of Formulae 2 to 4 and Formulae 5 to 7:

$Qz=(nx-nz)/(nx-ny)$ (1);

$75° \leq \phi P \leq 195°$ (2);

$95° \leq \phi P - \phi F1 \leq 115°$ (3);

$155° \leq \phi P - \phi F2 \leq 175°$ (4);

$-15° \leq \phi P \leq 105°$ (5);

$-115° \leq \phi P - \phi F1 \leq -105°$ (6);

$-175 \leq \phi P - \phi F2 \leq -165°$ (7);

where
   φP=an angle of the absorption axis direction of said polarizing film;
   φF1=an angle of the slow axis direction of said first retardation film on the polarizing film side;
   φF2=an angle of the slow axis direction of said second retardation film on the liquid crystal cell side; and
   all angles being measured from a reference line, said reference line being a bisector of a larger angle of the ordering direction of a liquid molecule closest to said first substrate and the ordering direction of a liquid molecule closest to said second substrate; and a twisting direction ΩLC of said nematic liquid crystal layer from said first substrate to said second substrate being determined as a positive direction.

2. The reflective liquid crystal display device of claim 1 satisfying the set of said Formulae 2 to 4, wherein said angle φP of the absorption axis direction of said polarizing film is either i) from 90° to 120°, or ii) from 155° to 185°.

3. The reflective liquid crystal display device of claim 1 satisfying the set of said Formulae 5 to 7, wherein said angle φP of the absorption axis direction of said polarizing film is either i) from 0° to 30°, or ii) from 60° to 90°.

4. The reflective liquid crystal display device of claim 1, wherein said is twisting angle of said nematic liquid crystal layer is from 60° to 65°.

5. The reflective liquid crystal display device of claim 1, wherein said z coefficient Qz of said first retardation film on said polarizing film side is from 0.3 to 0.7.

6. The reflective liquid crystal display device of claim 1, wherein said z coefficient Qz of said two retardation films is respectively from 0.3 to 0.7.

7. The reflective liquid crystal display device of claim 1, wherein said two retardation films are made of one of polyvinyl alcohol and norbornene derivative as a main constituent.

8. The reflective liquid crystal display device of claim 1, wherein a scattering film is disposed on a side of said first substrate.

9. The reflective liquid crystal display device of claim 8, wherein said scattering film is disposed between said retardation film and said first substrate.

10. The reflective liquid crystal display device of claim 8, wherein said scattering film is a forward scattering film.

11. The reflective liquid crystal display device of claim 1, wherein said optical reflecting means is a metal electrode containing at least one of aluminum and silver.

12. The reflective liquid crystal display device of claim 11, wherein said metal electrode has a mirror-finished surface.

13. The reflective liquid crystal display device of claim 11, wherein a scattering film is disposed on said metal electrode.

14. The reflective liquid crystal display device of claim 11, wherein said metal electrode has a surface roughened to an average tilt angle of 3° to 12° for diffusing and reflecting incident light.

15. The reflective liquid crystal display device of claim 1, wherein said second substrate is a transparent substrate, and said optical reflecting means is disposed on a side of said second transparent substrate outside said liquid crystal cell.

16. The reflective liquid crystal display device of claim 15, wherein an air layer is created between said transparent substrate and said optical reflecting means.

17. The reflective liquid crystal display device of claim 1, wherein a color filter is disposed within said liquid crystal cell.

18. The reflective liquid crystal display device of claim 1, wherein a non-linear device is disposed on said second substrate.

19. The reflective liquid crystal display device of claim 18, wherein an insulative flattening film is formed on said non-linear device, and said non-linear device and an electrode at said second substrate side are electrically connected through a contact hole created in said flattening film.

20. The reflective liquid crystal display device of claim 2, wherein said twisting angle $\Omega LC$ of said nematic liquid crystal layer is from 60° to 65°.

21. The reflective liquid crystal display device of claim 2, wherein a value of said z coefficient Qz of said first retardation film on said polarizing film side is from 0.3 to 0.7.

22. The reflective liquid crystal display device of claim 2, wherein a value of said z coefficient Qz of said two retardation films is respectively from 0.3 to 0.7.

23. The reflective liquid crystal display device of claim 2, wherein said two retardation films are made of one of polyvinyl alcohol and norbornene derivative as a main constituent.

24. The reflective liquid crystal display device of claim 2, wherein a scattering film is disposed on a side of said first substrate.

25. The reflective liquid crystal display device of claim 3, wherein a scattering film is disposed on a side of said first substrate.

26. The reflective liquid crystal display device of claim 4, wherein a scattering film is disposed on a side of said first substrate.

27. The reflective liquid crystal display device of claim 5, wherein a scattering film is disposed on a side of said first substrate.

28. The reflective liquid crystal display device of claim 6, wherein a scattering film is disposed on a side of said first substrate.

29. The reflective liquid crystal display device of claim 7, wherein a scattering film is disposed on a side of said first substrate.

30. The reflective liquid crystal display device of claim 9, wherein said scattering film is a forward scattering film.

31. The reflective liquid crystal display device of claim 12, wherein a scattering film is disposed on said metal electrode.

32. The reflective liquid crystal display device of claim 3, wherein said twisting angle $\Omega LC$ of said nematic liquid crystal layer is from 60° to 65°.

33. The reflective liquid crystal display device of claim 3, wherein a value of said z coefficient Qz of said first retardation film on said polarizing film side is from 0.3 to 0.7.

34. The reflective liquid crystal display device of claim 4, wherein a value of said z coefficient Qz of said first retardation film on said polarizing film side is from 0.3 to 0.7.

35. The reflective liquid crystal display device of claim 3, wherein a value of said z coefficient Qz of said two retardation films is respectively from 0.3 to 0.7.

36. The reflective liquid crystal display device of claim 4, wherein a value of said z coefficient Qz of said two retardation films is respectively from 0.3 to 0.7.

37. The reflective liquid crystal display device of claim 3, wherein said two retardation films are made of one of polyvinyl alcohol and norbornene derivative as a main constituent.

38. The reflective liquid crystal display device of claim 4, wherein said two retardation films are made of one of polyvinyl alcohol and norbornene derivative as a main constituent.

39. The reflective liquid crystal display device of claim 5, wherein said two retardation films are made of one of polyvinyl alcohol and norbornene derivative as a main constituent.

40. The reflective liquid crystal display device of claim 6, wherein said two retardation films are made of one of polyvinyl alcohol and norbornene derivative as a main constituent.

* * * * *

UNITED STATES PATENT AND TRADEMARK OFFICE
CERTIFICATE OF CORRECTION

PATENT NO.    : 6,407,787 B1
DATED         : June 18, 2002
INVENTOR(S)   : Tomoaki Sekime, Hisanori Yamaguchi and Yoshio Iwai It is certified that error appears in the above-identified patent and that said Letters Patent is hereby corrected as shown below:

Column 14,
Line 45, before "twisting", delete "is".

Signed and Sealed this

Eighteenth Day of March, 2003

JAMES E. ROGAN
*Director of the United States Patent and Trademark Office*